Figure 1:
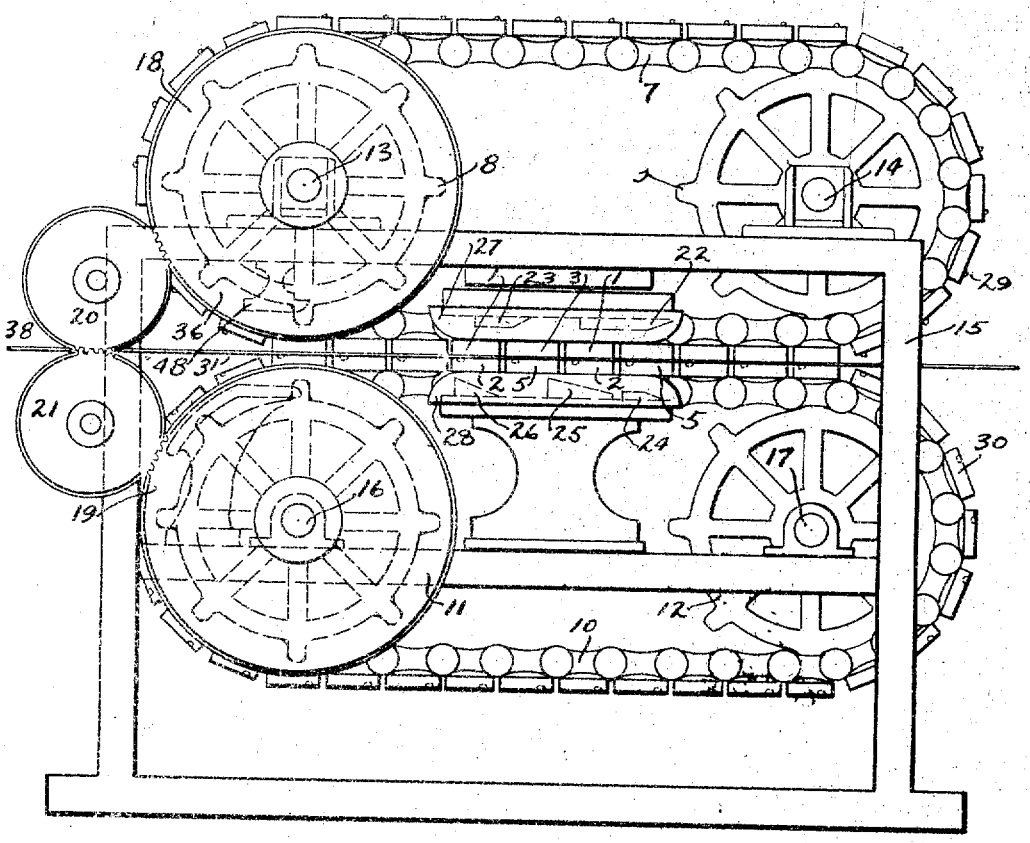

Mar. 27, 1923. Re. 15,566

H. WULFF

MACHINE AND METHOD FOR MAKING SHINGLES

Original Filed July 29, 1918 3 sheets-sheet 1

INVENTOR
HENRY WULFF
BY C. D. Enochs
ATTORNEY

Mar. 27, 1923.
Re. 15,566
H. WULFF
MACHINE AND METHOD FOR MAKING SHINGLES
Original Filed July 29, 1916 . 3 sheets-sheet 3
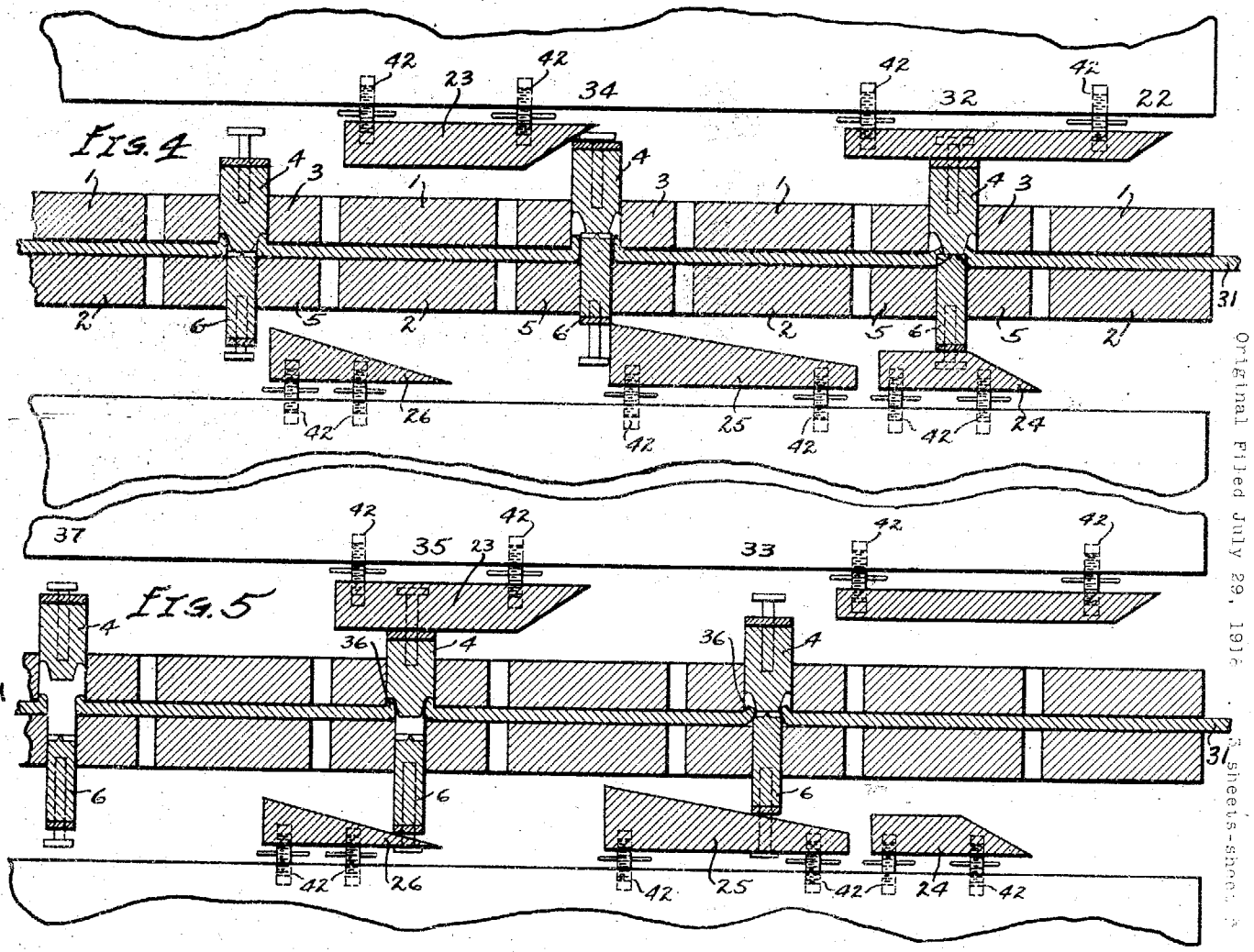
INVENTOR
HENRY WULFF
BY C. B. Enochs
ATTORNEY Mar. 27, 1923. Re. 15,566

H. WULFF

MACHINE AND METHOD FOR MAKING SHINGLES

Original Filed July 29, 1918 3 sheets-sheet 3

INVENTOR
HENRY WULFF
BY C. E. Crooks
ATTORNEY

Reissued Mar. 27, 1923.

Re. 15,566

UNITED STATES PATENT OFFICE.

HENRY WULFF, OF ST. PAUL, MINNESOTA, ASSIGNOR TO SILAS M. FORD, OF ST. PAUL, MINNESOTA.

MACHINE AND METHOD FOR MAKING SHINGLES.

Original No. 1,381,388, dated June 14, 1921, Serial No. 247,339, filed July 29, 1918. Application for reissue filed October 28, 1921. Serial No. 510,983.

*To all whom it may concern:*

Be it known that I, HENRY WULFF, a citizen of the United States, and a resident of St. Paul, in the county of Ramsey and State of Minnesota, have invented certain new and useful Improvements in Machines and Methods for Making Shingles, of which the following is a specification.

This machine is designed primarily for making shingles of the type shown in patent to Silas M. Ford, No. 1207523, dated Dec. 5, 1916, but provision is made for also using the machine for manufacturing shingles of the same general type without the reinforcement of the gutter walls.

One object of my invention is to provide in a machine for making shingles, traveling means for receiving a sheet of fiber and perform certain operations on the sheet while it is in the traveling means, so the sheet will be turned out in a completed shingle strip.

Of the incidental operations, one is to provide means for cutting and scoring portions of the sheet as it passes through the machine.

Another is to provide means for forming the edges of the gutter upwardly.

Another provides improved means for forming this upward extension back upon the sheet in the shape of reinforced edges for the tabs so as to reinforce the gutter wall.

Another object is to provide means in the same machine for blanking out strips of fiber so as to complete in the fiber a shingle strip without reinforced gutter wall.

With these and incidental objects in view, the invention consists of certain novel features of construction and combination of parts, the essential elements of which are hereinafter described with reference to the drawing which accompanies and forms a part of this specification.

Figure 2:
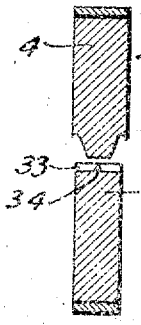
Figure 3:
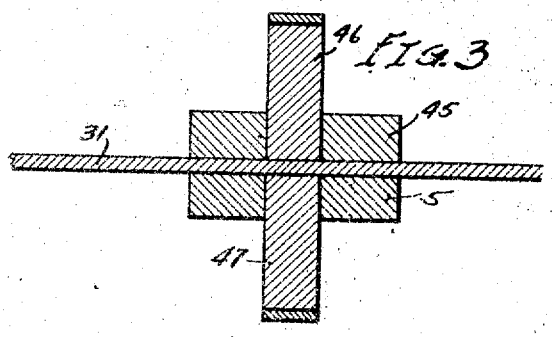
Figure 6:
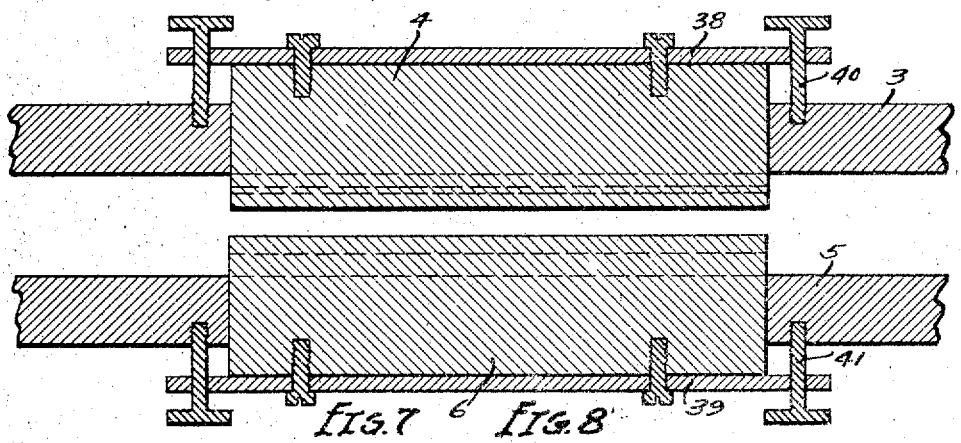
Figure 7:
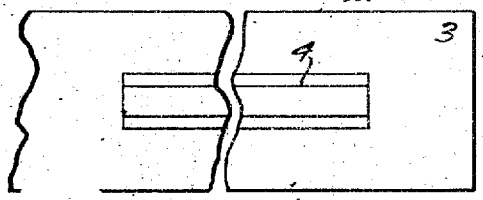
Figure 8:
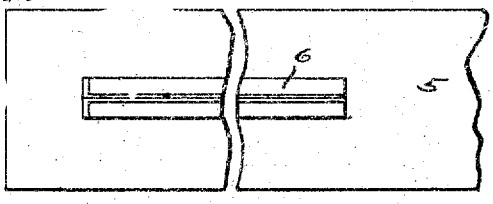
Figure 9:
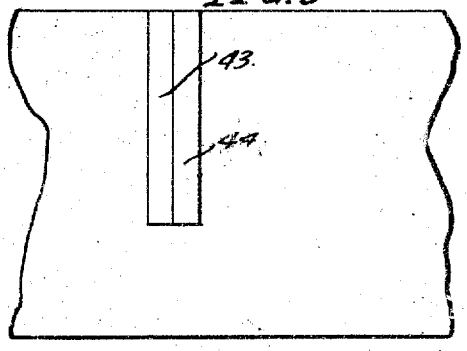
Figure 10:
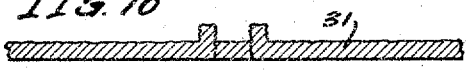
Figure 11:
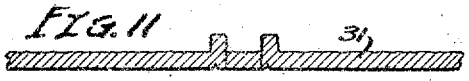
Figure 12:
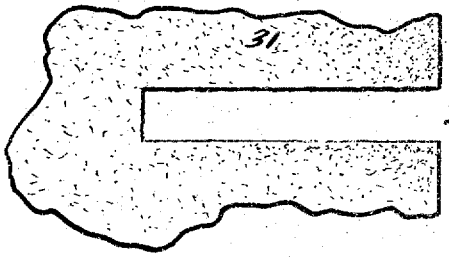

In the drawing Figure 1 is a side elevation of my machine. Fig. 2 is a sectional view of the cutting and scoring die operating from the bottom and the forming die operating from the top. Fig. 3 is a sectional view showing two co-operating bars carrying dies therein for making the unreinforced type of shingle strip. Fig. 4 is an enlarged sectional detail showing a part of the camming operations of the machine. Fig. 5 is a similar view showing the remainder of the camming operations. Fig. 6 is an enlarged sectional detail of the tool carrying bars with co-operating dies. Fig. 7 is a fragmentary bottom view of the upper forming die. Fig. 8 is a fragmentary plan view of the lower cutting and scoring die. Fig. 9 is a fragmentary detail of the bottom side of a portion of a fiber sheet showing the scoring and cutting lines. Fig. 10 is a sectional view of a portion of a fiber sheet showing the first formation of the gutter walls and Fig. 11 is a similar view showing the completed formation of the side gutter walls and Fig. 12 is a plan view of a shingle strip without the reinforced gutter wall.

As shown in the drawings, a strip of sheet material is drawn through the machine and a shingle strip is formed therefrom during the progress of the sheet through the machine.

Looking at Fig. 1 the strip would be passed in from the right and the bars 1 and 2 will seize and pull the strip firmly, the function being purely that of pressure bars.

The bars 3 each carry a forming die such as 4 Fig. 2, and the bars 5 carry cutting and scoring dies, such as 6 Fig. 2.

The bars 1 and 3 are carried by the sprocket chain 7 running over the sprocket wheels 8 and 9, and the bars 2 and 5 are carried on the sprocket chain 10 running over the sprocket wheels 11 and 12. Shafts 13 and 14 suitably journaled on the frame 15 carry the sprocket wheels 8 and 9 respectively, and similarly the shafts 16 and 17 also journaled on the frame 15 carry the sprocket wheels 11 and 12.

Gears 18 and 19 serve to drive the shafts 13 and 16 and these gears in turn are interconnected by pinions 20 and 21 one of which is turned by any suitable source of power.

From the foregoing it will be seen that the two chains carry bars in which the dies are mounted, and also the pressure bars for holding the fiber. Mounted on the frame 15, are two cams 22 and 23, adapted to operate the upper dies as will be hereinafter explained, and similarly cams 24 and 26 are carried on the frame and serve to operate the lower dies. Guide members 27 and 28 likewise supported by the frame serve to press the two sets of upper and lower bars firmly against the fiber as these bars pass between the guides, and dowel pins 29 registering with holes 30 are provided to positively line up the dies carried by the bars.

Each of the cams is adjustably mounted on its support so the amount of camming accomplished by each cam and hence the effective movement of the dies may be adjusted for various thicknesses of fiber.

Looking at Figs. 4 and 5 it will be seen that the cam 22 is the first one to affect each of the dies 4 as they pass thereunder; this cam is so adjusted that it will press downwardly each of the dies 4 as it passes thereunder so the lower surface of the dies will rest on the fiber sheet 31 as at 32.

While the die 4 is so positioned and the fiber sheet is passing to the left, the cam 24 will move the co-operating die 6 upwardly so that the knife edges 33 and 34, Fig. 2 will cut completely through the fiber sheet 31 as plainly shown in Fig. 4 at 32.

The die 4 is then relieved as shown at 33 Fig. 5, and likewise the die 6 drops from the cam 24 and starts to ride up the cam 25, thus forming the edges 36 upwardly, the completion of this operation being shown at 34 Fig. 4, and as the die 4 is no longer held by the cam it will be lifted up by the die 6.

At the point 34 Fig. 4 the die 6 drops off the cam 25 and the die 4 is pushed downwardly again, this time by the cam 23, forming the up turned edges of the fiber 36, as shown at 35, Fig. 5.

The die 6 is again moved upwardly, this time by the cam 26, and by the time the upper surface of the die 6 meets the lower surface of the die 4, the die 4 has ridden past the cam 23 so that it may be pushed free of the fiber and the die 6 sets the lower edge of the fiber and then drops from the cam 26 and leaves the fiber in completed form as shown at 37 Fig. 5.

The cams both being free from the fiber it is now delivered at 38 Fig. 1 in the shape of a completed shingle strip.

The formation of the fiber at the point 32 Fig. 4 is shown in Fig. 9 the formation at the point 34 is shown in Fig. 10, and the completed formation as at 37 Fig. 5 is shown in Fig. 11.

The dies 4 and 6 Fig. 6 are mounted in their respective bars 3 and 5 with a snug slide fit and the strips 38 and 39, preferably of steel are suitably fastened to the dies, and screws 40 and 41 mounted in the bars 3 and 5 respectively and passing through the strips 38 and 39 limit the motion of the dies.

Adjusting screws 42 Figs. 4 and 5 are provided to adjust the height of the cams and hence the effective lift of the dies.

When shingle strips are made having the portions 43 and 44 Fig. 9 punched free from the sheet instead of scored and formed, the bars 3 are replaced by bars 45 in which are mounted knock-outs 46 Fig. 3 and the dies 6 in the bars 5 are replaced by punches 47 which with the similar die bar carrying the knock-outs 46 blanks out the portions 43 and 44 Fig. 4 in a single piece, thus producing a shingle strip without reinforced gutter walls.

It is evident that only the cam 25 is required in this operation, the other cams being removed. In the movement of strips of this type from left to right, the cam 25 operates the blanking punch, the knock-out being forced out of the female portion of the bars 45 by the punch, thus leaving the punched out portion of the fiber in the female portion of the bar 45 below the knock-out 46.

A cam 48 Fig. 1 suitably mounted on the frame presses the knock-out downwardly and forces the punched out blank out of the die, letting it fall on the strip where it is now free from the machine.

While the shingle strips made on the machine with the replaced upper bars and replaced lower punches, would have a gutter cut therein which would be clean cut, it is preferable for certain cases to form shingles having a deckled edge.

If this deckled edge is desired, the same punch is used as when cutting the straight unreinforced shingle strip, but the upper bars therein are changed so that the female portion of the die is considerably larger than the male portion and a clean cut is not made but the material is roughly fractured giving the appearance as shown in Fig. 12 and obviously the material may be reversed in the machine and the deckled edge produced in the fiber rather than in the coating, as shown. In this connection it is advisable to note that when the deckled edge is to be produced the material must be of a much more brittle nature than when shingle strips having reinforced gutter walls are being made.

While I have described my invention and illustrated it in several designs, I do not wish it understood that I limit myself to these constructions, as it is evident that the application of the invention may be varied in many ways within the scope of the following claims.

Claims:

1. In a machine for making shingles, the combination with two co-operating traveling means, of a die carried by one of said traveling means for forming upwardly portions of a shingle strip, and a die carried by the other of said traveling means for again forming the material formed by said first named die.

2. In a machine for making shingles, the combination of two endless traveling means, each having transverse bars positioned thereacross, a cutting die carried by a transverse bar carried by one of said endless traveling means, a forming die carried by a transverse bar carried by the other of said endless traveling means, and means for actuating said die while in motion.

3. In a machine for making shingles, the combination of a frame, an endless traveling means supported by said frame and carrying thereon transverse bars, dies positioned in a portion of said bars, adjustable means mounted on said frame for actuating said dies, a second endless traveling means carried by said frame and having transverse bars carried thereby, dies carried by a portion of said transverse bars, and adjustable means for operating said dies, the relation of said two sets of dies being such that they co-operate one with the other.

4. In a machine for making shingles, the combination of a frame, two endless traveling means, two sets of co-operating pressure bars, each set being carried by one of said endless traveling means, a die carried in one of said bars for scoring fiber passed between said two sets of bars, and a die carried by the co-operating bar of the other set for forming fiber passed between said co-operating sets of bars.

5. In a machine for making shingles, the combination of a frame, a lower endless chain, an upper endless chain, each mounted for continuous movement in said frame, and each carrying thereon a series of transverse bars adapted to grip sheet material, a guide carried by said frame and adapted to firmly hold said transverse bars with respect to each other as they pass through said guide.

6. In a machine for making shingles, the combination of a frame, a lower endless chain, an upper endless chain, each mounted for continuous movement in said frame, and each carrying thereon a series of transverse bars, a guide carried by said frame and adapted to firmly hold said transverse bars with respect to each other as they pass through said guide, one of said sets of bars having projecting dowel pins and the other of said sets of bars having apertures cooperating with said dowel pins to positively aline said bars as they pass through said guide.

7. In a machine for making shingles, the combination with endless traveling means, including a die for forming shingle material, of a cam for actuating said die, and means for adjusting the height of said cam and through said adjustment the effective motion of said die.

8. In a machine for making shingles the combination of a frame, a lower endless chain, an upper endless chain, each mounted for continuous movement in said frame, and each carrying thereon a series of transverse bars, a guide carried by said frame and adapted to firmly hold said transverse bars with respect to each other as they pass through said guide, and means for positively alining the upper bars and the lower bars with each other as they pass through said guide.

9. In a shingle strip cutting machine the combination of endless carriers operated in paths to bring them adjacent to each other during a substantial portion of their movement, bars arranged in complementary pairs, one bar of each pair being on each carrier, to grip and draw sheet material into the machine, one of the bars of certain of said pairs having a female die and the other bar of said pair having a cutter die, and means for operating said cutter die during a portion only of the motion of the pair adjacent to each other.

10. In a shingle strip cutting machine, the combination of endless carriers operated in paths to bring them adjacent to each other during a substantial portion of their movement, bars adapted to frictionally engage sheet material carried by the carriers and arrange in complementary pairs for the two carriers, one of the bars of a pair having a female die, and the other bar having a cutter die, and means for operating said cutter die during a portion only of the motion of the pair adjacent to each other, said bars having means to align them together during said adjacent movement.

11. In a shingle strip cutting machine, the combination of endless carriers operated in paths to bring them adjacent to each other during a substantial portion of their movement, bars adapted to grip sheet material carried by the carriers and arranged in complementary pairs for the two carriers, one of the bars of a pair having a female die, and the other bar having a cutter die, and means for operating said cutter die during a portion only of the motion of the pair adjacent to each other, said cutter die being mounted to slide in the bar, and means for maintaining it out of projected position except when positively operated.

12. In a shingle strip cutting machine, the combination of endless carriers operated in paths to bring them adjacent to each other during a substantial portion of their movement, bars adapted to grip sheet material carried by the carriers and arranged in the complementary pairs for the two carriers, one of the bars of a pair having a female die, and the other bar having a cutter die, and means for operating said cutter die, during a portion only of the motion of the pair adjacent to each other, said cutter die being mounted to slide in the bar, and means for maintaining it out of projected position except when positively operated, and said operating means for the cutter die comprising a stationary abutment set in the path thereof.

13. In a machine of the character described, the combination of endless carriers operated in paths to bring them adjacent to each other during a substantial portion of their movement, so as to receive and frictionally engage sheet material to be operated upon between their surfaces, tool carriers arranged on both carriers so as to come into juxtaposition with each other, tools in the carriers, and means for operating the tools during a portion of the juxtaposed movement of the carriers, said carriers having aligning means adapted to align the juxtaposed pairs thereof preparatory to the tool operation.

HENRY WULFF.